J. F. GAIL.
LINK FORMING MACHINE.
APPLICATION FILED MAY 2, 1913.
1,148,767.
Patented Aug. 3, 1915.
10 SHEETS—SHEET 1.
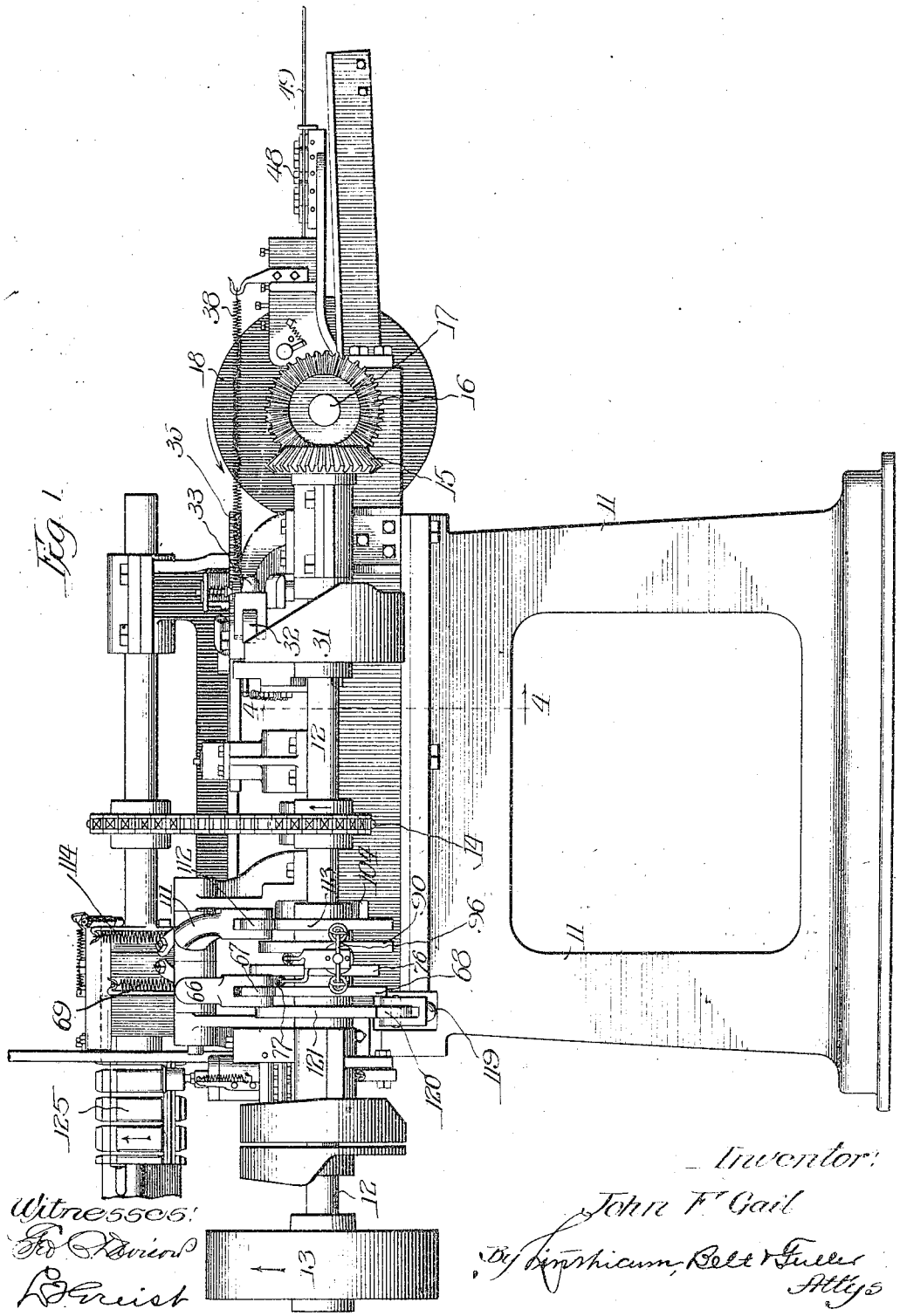
Witnesses:
Inventor:
John F. Gail
By Linthicum, Belt & Fuller
Attys J. F. GAIL.
LINK FORMING MACHINE.
APPLICATION FILED MAY 2, 1913.
1,148,767.
Patented Aug. 3, 1915.
10 SHEETS—SHEET 2.
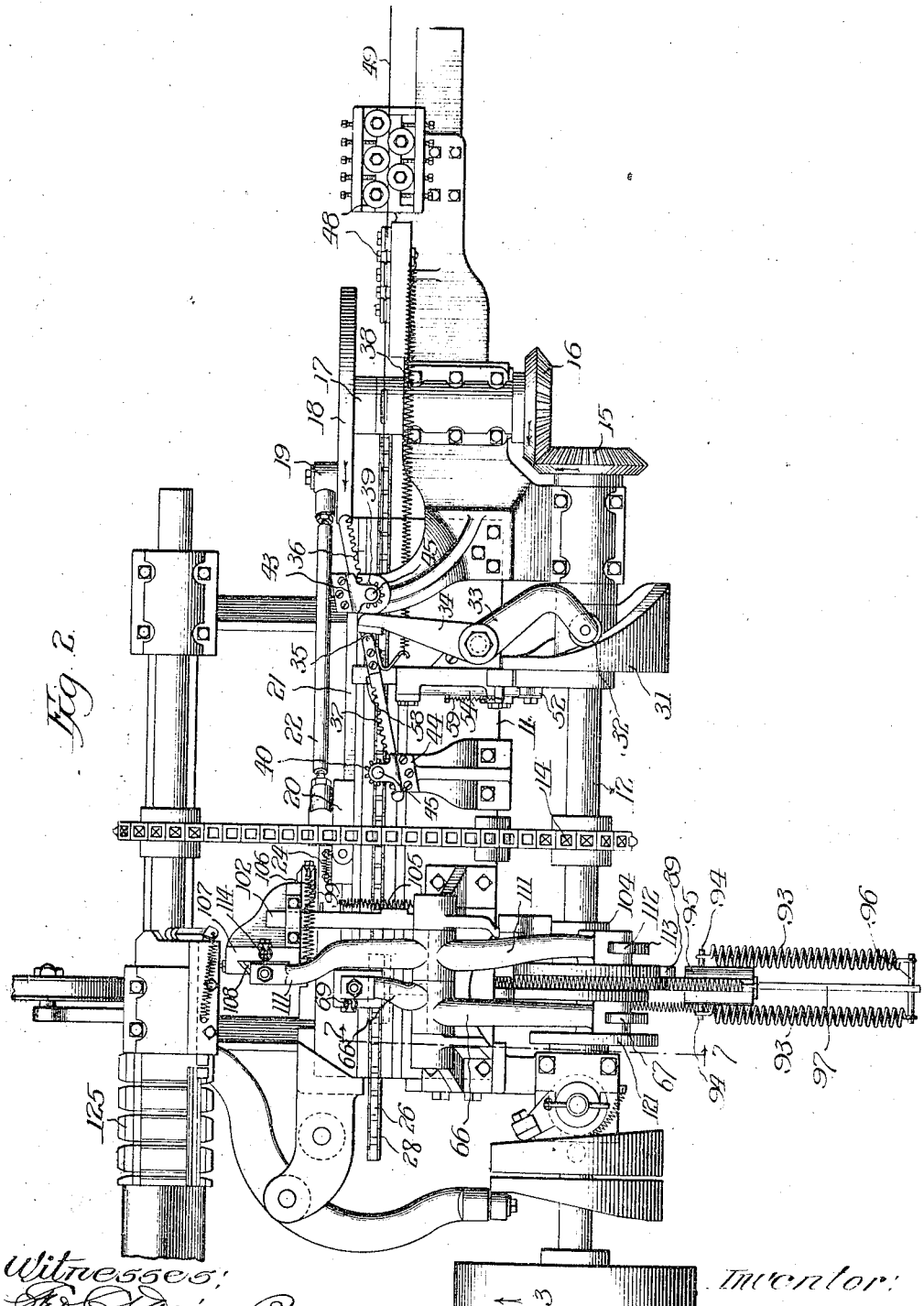

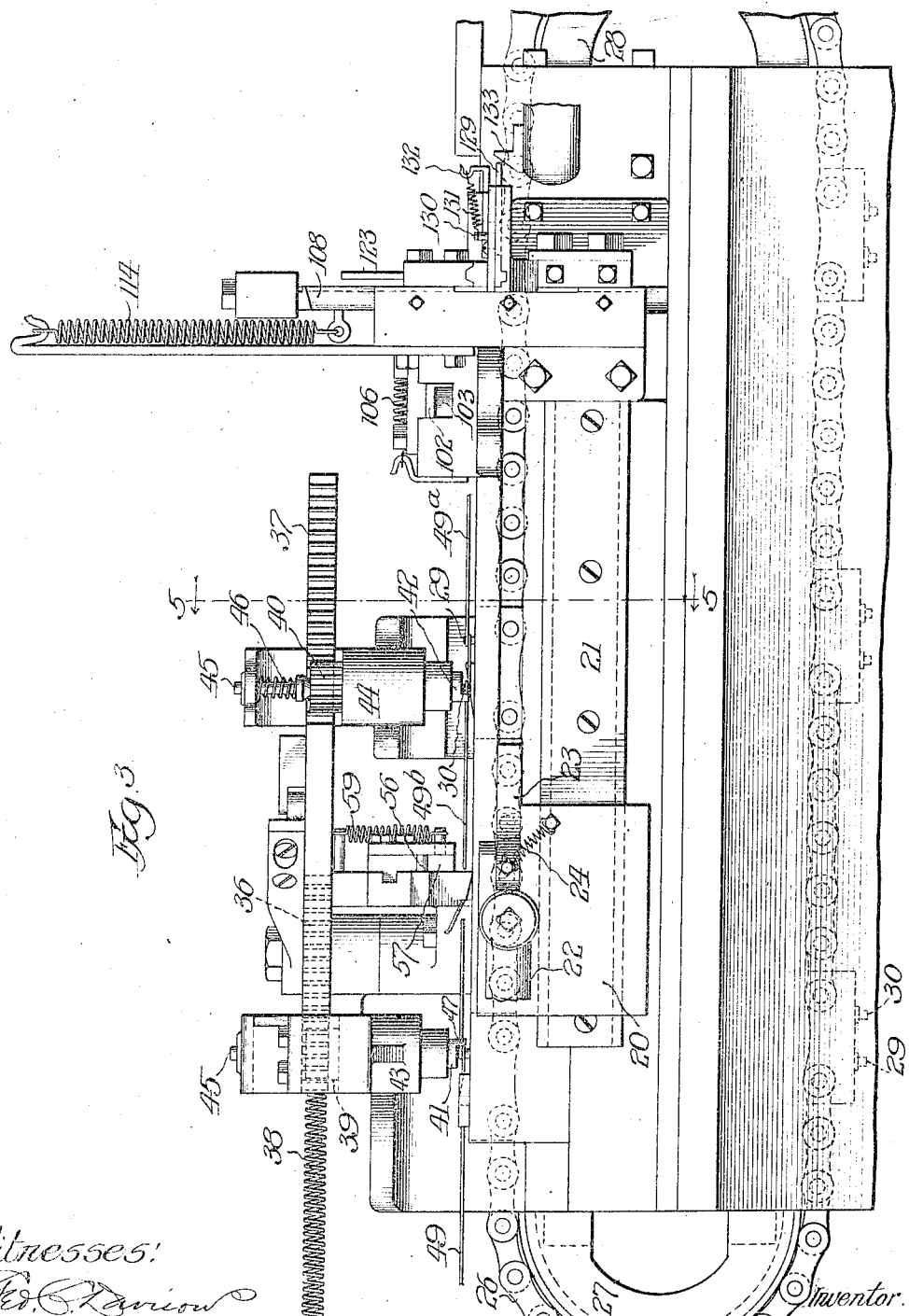

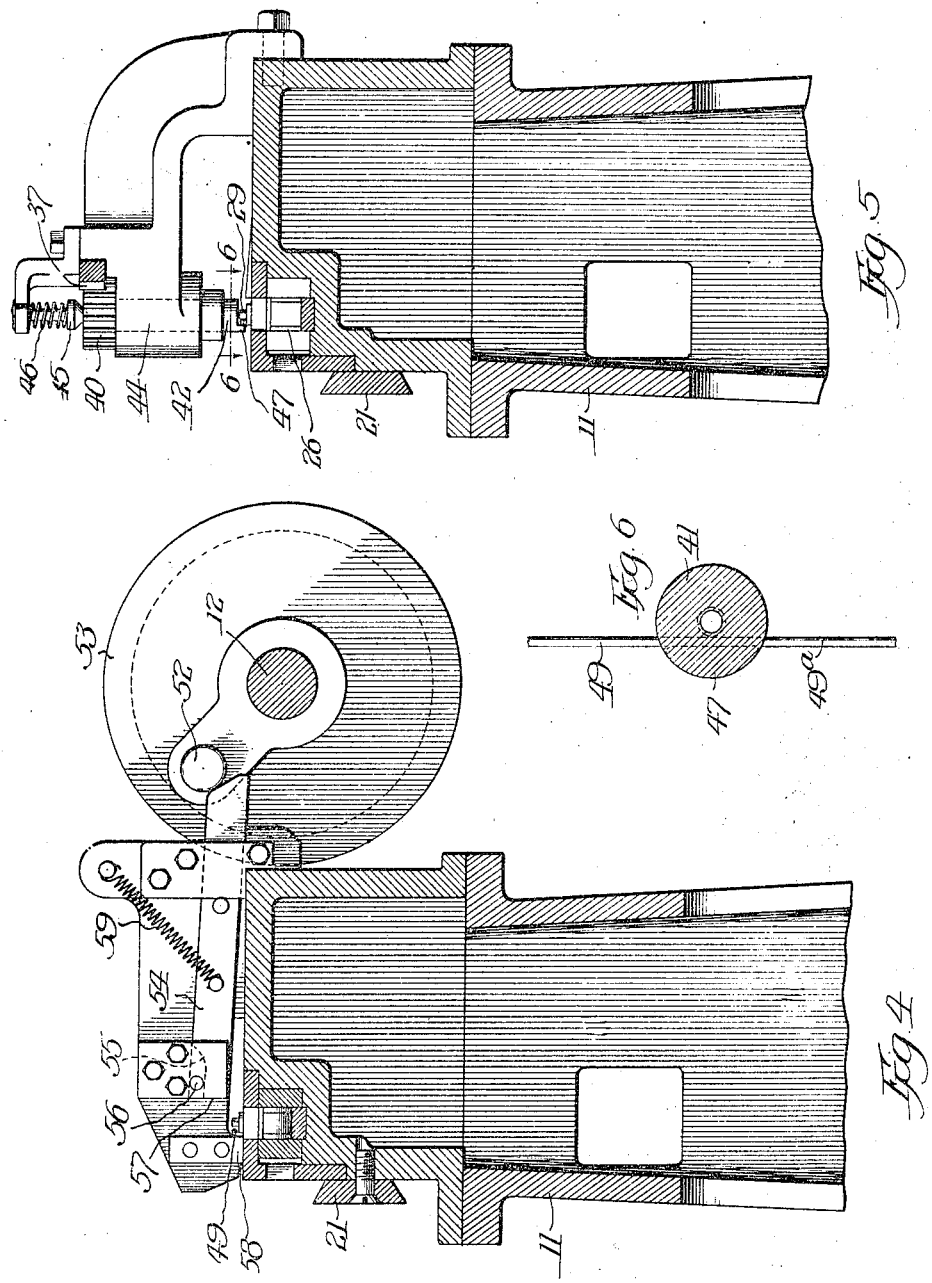

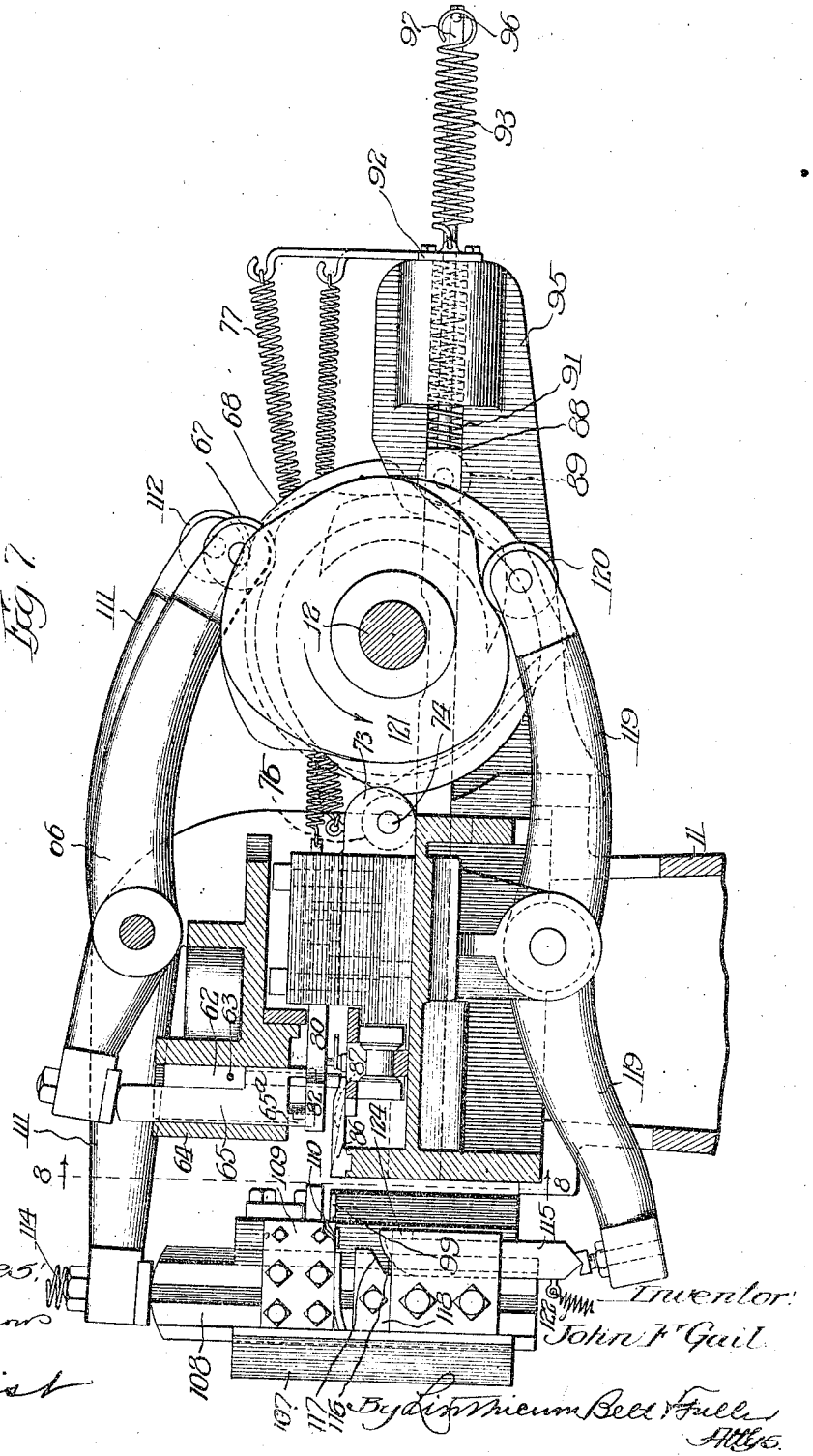

J. F. GAIL.
LINK FORMING MACHINE.
APPLICATION FILED MAY 2, 1913.
1,148,767.
Patented Aug. 3, 1915.
10 SHEETS—SHEET 6.
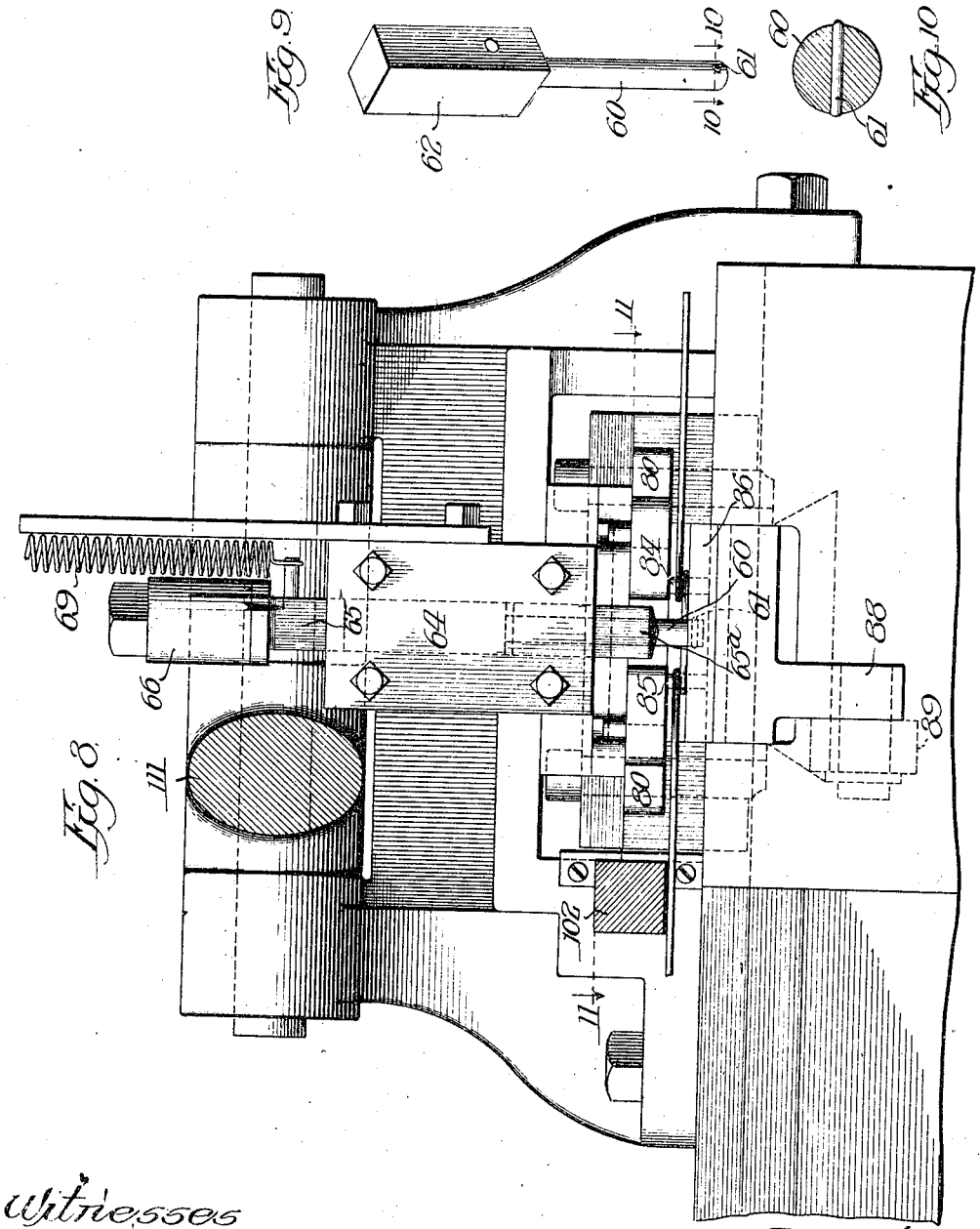

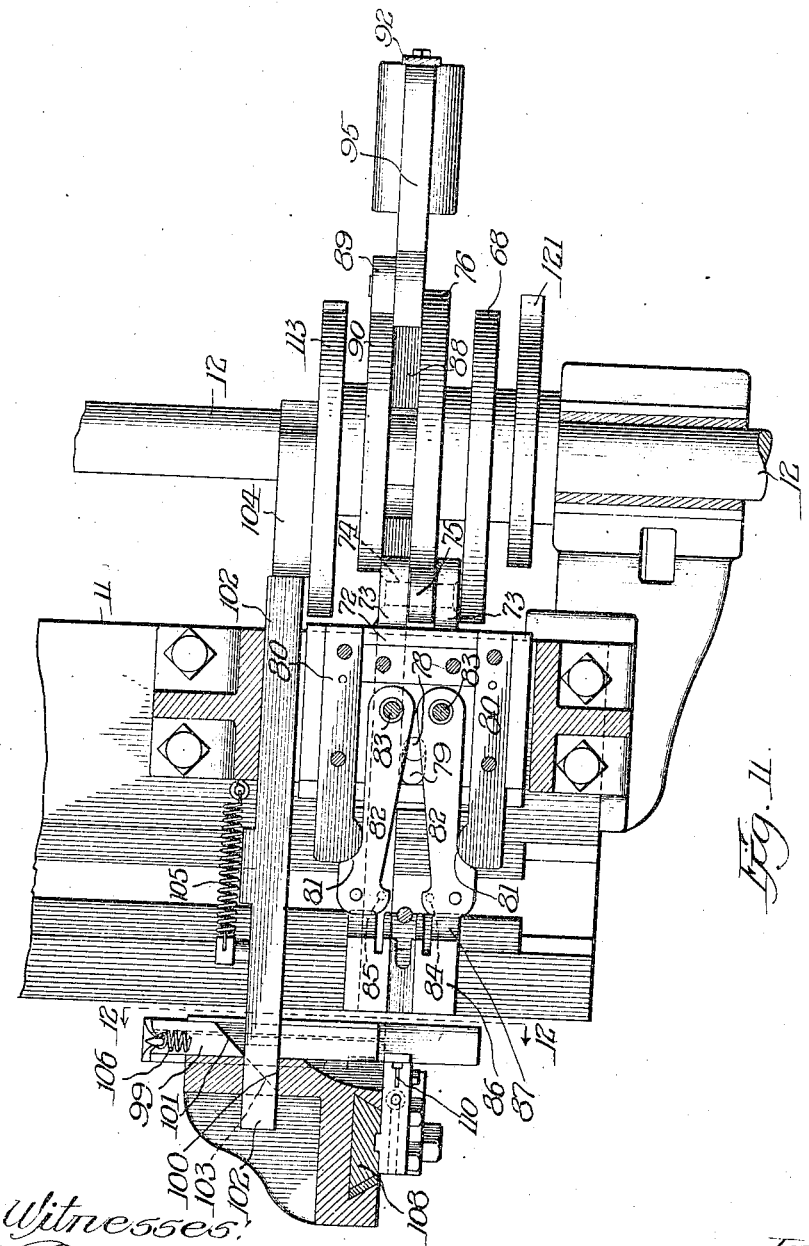

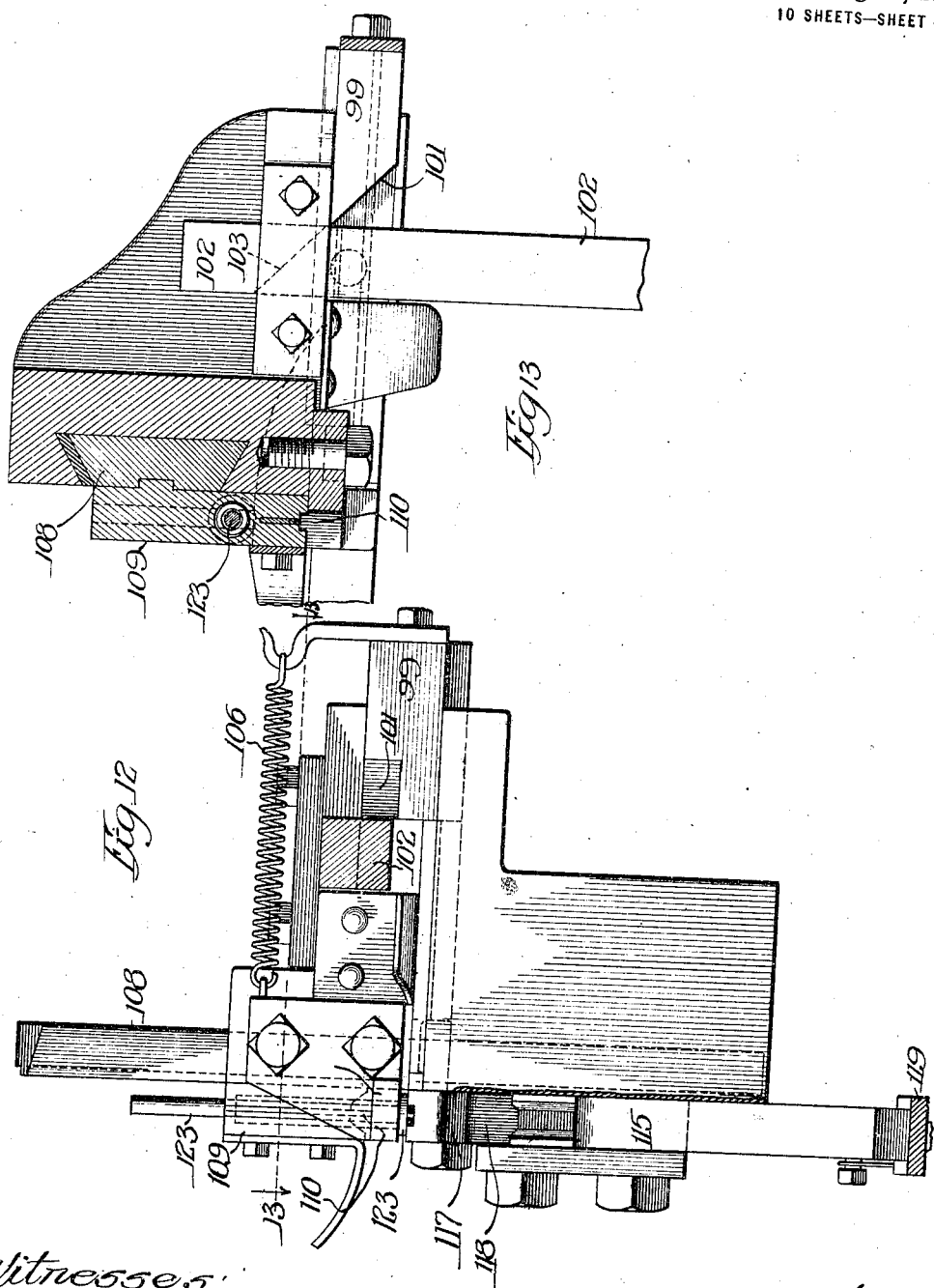

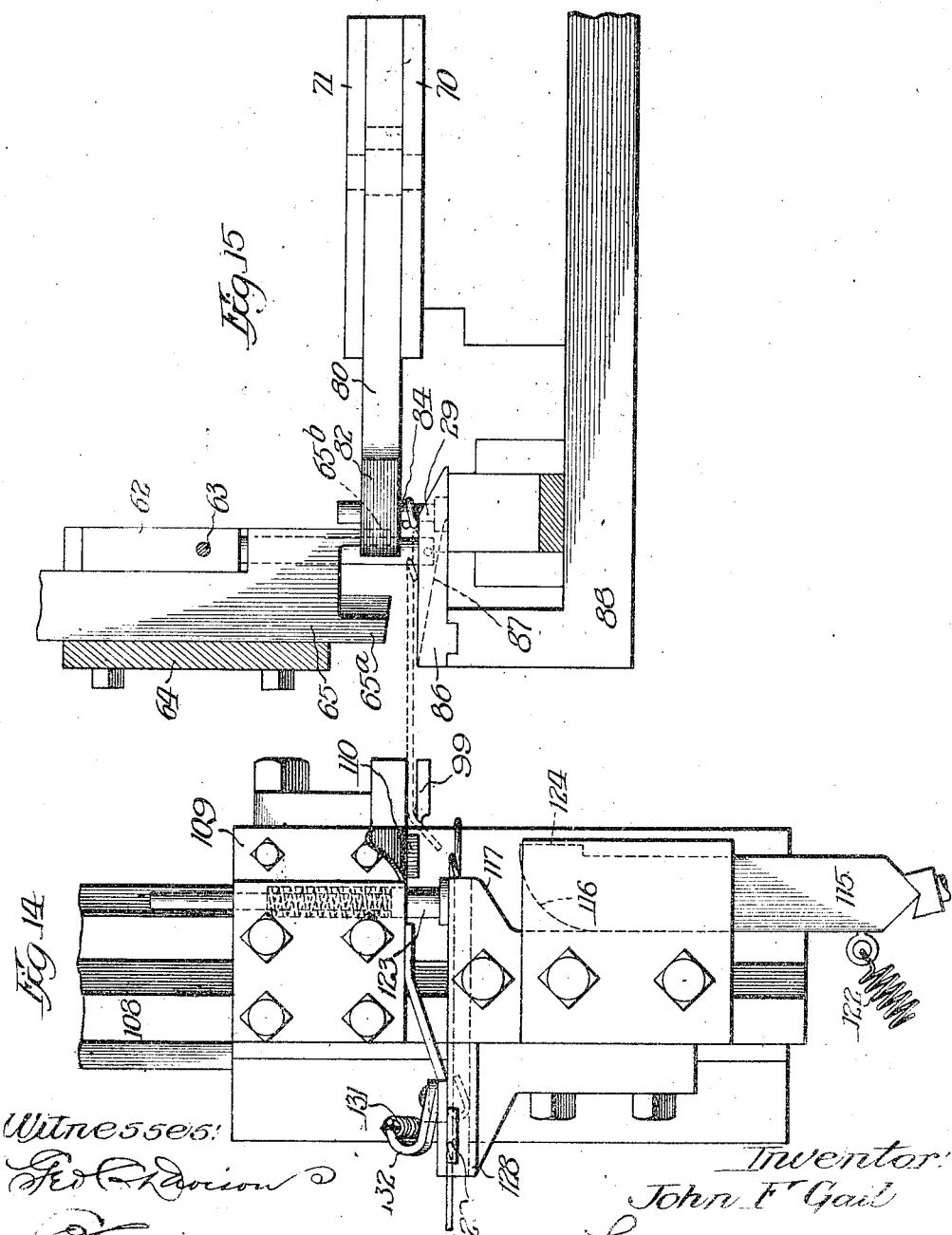

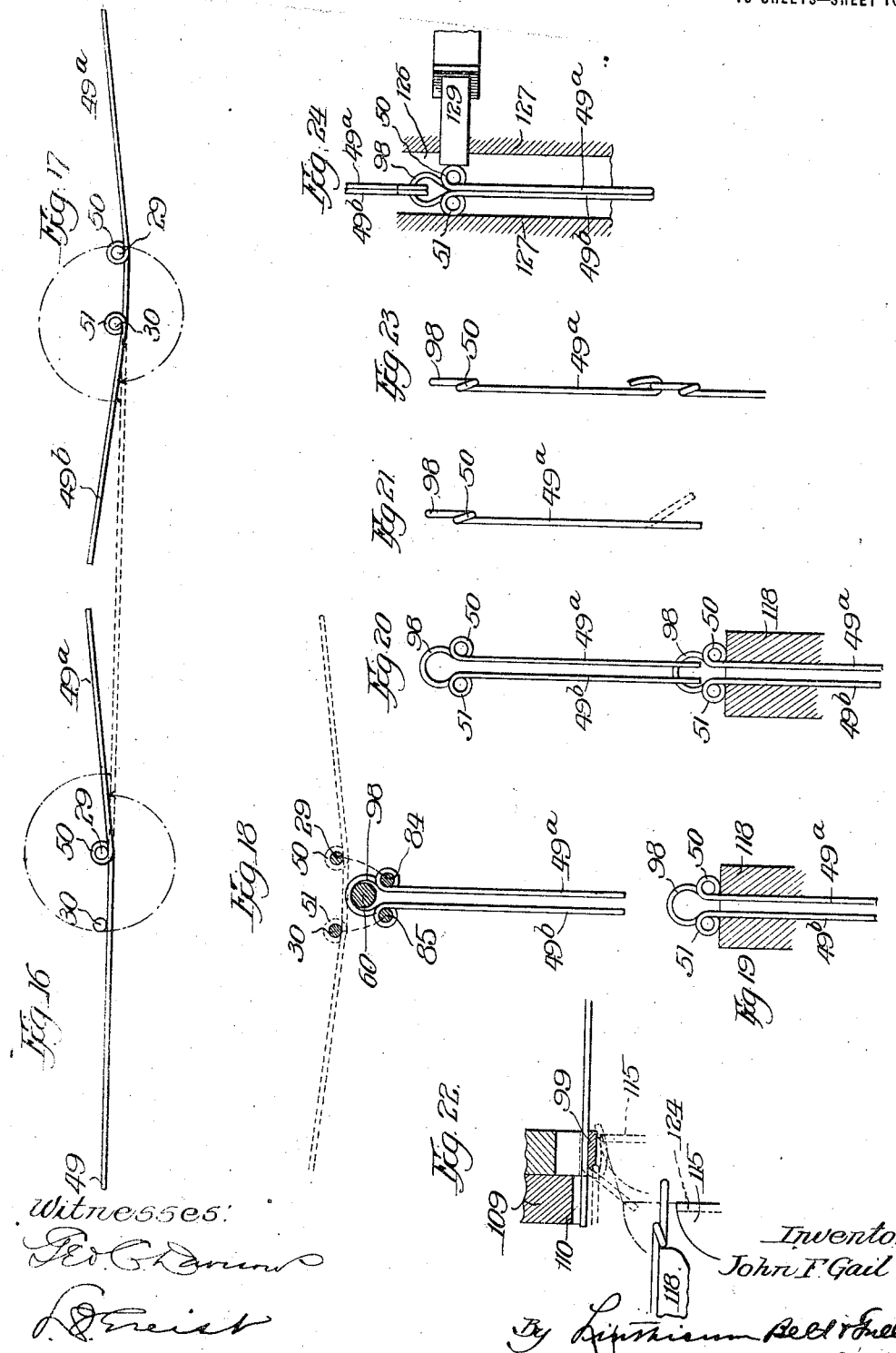

UNITED STATES PATENT OFFICE.

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

LINK-FORMING MACHINE.

1,148,767.      Specification of Letters Patent.      Patented Aug. 3, 1915.

Application filed May 2, 1913. Serial No. 765,068.

*To all whom it may concern:*

Be it known that I, JOHN F. GAIL, a citizen of the United States, residing at Kenosha, in the county of Kenosha and State of Wisconsin, have invented certain new and useful Improvements in Link-Forming Machines, of which the following is a specification.

This invention relates to improvements in machines for forming links, and refers more particularly to a machine which is particularly adapted to make links of chains used in the construction of wire link bed fabrics.

Among the salient objects of the invention are, to provide an automatic machine for cutting off lengths of wire from a continuous wire supply and forming such lengths into the shape of links; to provide a machine of the type referred to in which the formed links are successively and automatically connected to form a continuous chain; to provide a machine in which the feeding forward of the wire from the continuous wire supply is effected by the machine itself subsequent to a preliminary forming operation effected on the end of the continuous wire supply and prior to the severing of the link length; to provide a machine of the class described in which the operation of shaping the link is performed progressively upon the wire by successive forming mechanisms; to provide a machine of the class described in which the severing of the wire forming the link is accomplished subsequent to a preliminary shaping operation performed upon the end of the continuous wire supply and before the link is completed; to provide a machine of the class described in which the wire from which the link is to be formed is progressively advanced step by step into the respective fields of the different forming mechanisms; to provide a machine of the class described in which the preliminary shaping operation performed upon the end of the continuous wire is effective in engaging the said formed end with the feeding mechanism; to provide a machine of the class described in which the wire is advanced by the feeding mechanism initially as a part of the continuous wire supply, said part then being automatically severed and then advanced step by step to the mechanism for completing the links and connecting them into a continuous chain; to provide in a machine of the class described endless feeding mechanism having a uni-directional and intermittent movement for progressively advancing the wire into engagement with the various mechanisms for operating on said wire; to provide a machine which shall be extremely simple, rugged and economical in construction and very rapid and efficient in operation, and, in general, to provide an improved machine of the character referred to.

In order that the invention as hereinafter fully described and particularly claimed may be readily understood, I have based such description upon a preferred embodiment of the invention illustrated in the accompanying drawings, wherein—

Figure 1 is a rear elevation of such machine; Fig. 2 is a top plan view of the same; Fig. 3 is a front elevation; Fig. 4 is a vertical transverse section on the line 4—4 of Fig. 1; Fig. 5 is a similar view on the line 5—5 of Fig. 3; Fig. 6 is an enlarged detail section taken on the line 6—6 of Fig. 5; Fig. 7 is a vertical transverse section on the line 7—7 of Fig. 2; Fig. 8 is a view partly in section taken on the line 8—8 of Fig. 7; Fig. 9 is a detail view of a link forming pin; Fig. 10 is an enlarged detail section on the line 10—10 of Fig. 9; Fig. 11 is a plan view partly in section taken on the line 11—11 of Fig. 8; Fig. 12 is a vertical section on the line 12—12 of Fig. 11; Fig. 13 is a horizontal section on the line 13—13 of Fig. 12; Figs. 14 and 15 are views respectively on an enlarged scale of associated parts shown in the left hand portion of Fig. 7; and Figs. 16 to 24 inclusive represent successive steps in the operation of the machine.

Having reference in detail to the drawings, the numeral 11 designates the machine frame upon which is journaled in suitable bearings the main shaft 12 provided with a drive pulley 13, the sprocket 14, and the beveled gear 15 which is in mesh with a similar gear 16 upon the shaft 17 which carries at its opposite end the crank disk 18 provided with the crank pin 19, whereby is reciprocated the head 20 upon the guide 21 through the crank rod 22. The head 20 has pivoted thereon a pawl 23 yieldingly pressed laterally by the spring 24 into engagement with the overlying ends of blocks 25 interposed at spaced intervals in the carrier chain 26 which travels about the end guides 27 and 28. Each of the blocks 25 is provided with a pair of eye forming pins 29 and 30.

Upon the shaft 12 is mounted a cam 31 for engagement with a roller 32 mounted upon one arm 33 of a lever, the other arm 34 of which bears against the roller 35 mounted upon a rack bar provided upon its two end portions with oppositely facing rack teeth 36 and 37 whereby the rack is reciprocated in active direction against the tension of the spring 38, it being returned by said spring in the inactive direction. The two toothed portions of the rack bar are in mesh respectively with pinions 39 and 40 which have their shafts 41 and 42 suitably mounted in the bearings 43 and 44 so as to provide for slight longitudinal movement of said shaft and pinions. Upon the upper face of each of the pinions bears the lower conical face of a slidably mounted thrust pin 45, said pins being downwardly pressed against the pinions by their springs 46 so as to normally hold the pinions and shafts in their lowermost position but permit the same to yield upwardly against the tension of the springs 46. The lower end of each of the shafts 41 and 42 is stepped to provide a downwardly projecting fillet 47, the lower face of which occupies a plane below the general plane of the end of the shaft as clearly shown in Figs. 3 and 5. The line of travel of the pins 29 and 30 on the blocks 25 coincides substantially with the axes of the two shafts 41 and 42 and the drive of the chain 26 is so gaged as to bring a pin 29 to a position of rest with the axes of the shaft 41 and said pin 29 coincident and also with the axis of a pin 30 coincident with the axis of the shaft 42. In such position the upper ends of the pins extend upwardly above the lower plane of the fillets and the periphery of each pin is separated from the fillet by a space corresponding substantially to the diameter of the wire of which the links are to be made.

The feeding mechanism receives the wire 49 supplied by the wire straightener 48 and feeds the same into a position where its forward end extends a slight distance beyond the spinner shaft 41 between the pin 29 and the fillet 47. The spinning of the shaft 41 by its pinion 39 causes the terminal portion 49$^a$ of the wire to be engaged by the fillet 47 and swept around the pin 29, as indicated in Fig. 16, forming within said wire an eye 50 and leaving the terminal portion 49$^a$ at a slight inclination to the line of travel. A second reciprocation of the head 20 propels the chain 26 forward and with it the wire 49 by its engagement with the pin 29, the forward end 49$^a$ of the wire being guided by the deflector 51 beneath the knife mechanism, later to be described, until the chain and block come to rest, as shown in Fig. 3, with the pin 30 in axial alinement with the spinner 42. Thereupon the crank arm 52 of the crank disk 53 engages the end of the knife bar 54 and forces the same to the left, as shown in Fig. 4, the cam end face 55 of the same engaging the stud 56 to force the knife end 57 downward into horizontal alinement with the wire 49 whereupon the continued forward movement of the knife bar 54 severs the wire by the shearing action between the forward end 57 of the knife bar and the edge of the knife plate 58, the knife bar being returned to its original position after the cutting of the wire by means of the spring 59. The rear terminal portion 49$^b$ of the wire thus severed is now, by the rotation of the spinner shaft 42 by means of its pinion 40, swept around the pin 30, as indicated in Fig. 17, thus forming within said wire an eye 51, the terminal wire portion 49$^b$ retaining a position at an inclination to the line of travel as indicated. At the same time that the eye 51 is being formed about the pin 30 and immediately after the wire has been severed by the knife, another eye 50 is being formed by the spinner 41, the wire being progressively operated upon in successive steps during its passage through the machine. After having had the two eyes 50 and 51 formed therein the link section, in the condition shown in Fig. 17, is moved forward at the next actuation of the carrier chain to the position shown in dotted lines in Fig. 18, with the pins 29 and 30 immediately to the rear of and longitudinally spaced equally from the pin 60 which is of larger diameter than the pins 29 and 30 and is provided near its lower end with a transverse pin 61 the end of which protrudes slightly from the periphery of the pin 60 (Figs. 8, 9 and 15). The pin 60 has a square shank 62 which is secured by means of a screw bolt 63 in a stationary portion 64 of the machine frame. Guided within the member 64 is a reciprocating stripper bar 65 bifurcated in its lower portion to provide the downward projections 65$^a$ and 65$^b$, one of which is disposed in front of and the other in the rear of the pin 60, upon which latter the stripper bar 65 also slides, as clearly indicated in Fig. 15. The stripper bar 65 is intermittently reciprocated in a downward direction by means of the lever 66 one arm of which engages the top of said bar and the other arm of which carries a roller 67 engaged by the cam 68, mounted upon the main shaft 12, the return stroke of the bar being effected by means of a suitably anchored coil spring 69 shown in Fig. 7.

Disposed immediately to the rear of the stripper bar 65 and the pin 60 in transverse alinement therewith (Figs. 7, 11 and 15) is a slidably mounted block 70 upon which and beneath the cap plate 71 is mounted a slidable plate 72, the block 70 having ears 73, 73 connected by the pin 74 carrying a roller 75 which engages the cam 76 upon the shaft 12, whereby the block 70 is reciprocated in a forward direction, the said block being retracted by means of the suitably anchored spring 77. A pin 78 fixed in the block 70 extends through a slot 79 of the plate 72 so as to permit of slight relative independent movement of the said block and plate. Upon the two edges of the block 70 are fixed cam strips 80, 80 extending in a parallel direction and provided at their forward ends each with a cam face 81. A pair of arms 82, 82 are pivoted at adjacent points 83, 83 to the plate 72 to swing in a scissors-like manner toward and from each other. These arms are curved upon their outer edges to correspond to the cam faces 81 of the strips 80 as clearly shown in Fig. 11. Upon their lower faces the arms are provided with a pair of pins 84 and 85 which, in the separated position of the arms, as shown in Figs. 11 and 15, are directly in alinement respectively with the pins 29 and 30 upon which rest the coils of wire forming the eyes 50 and 51, the lower ends of the pins 84 and 85 being in contact with the upper ends of the pins 29 and 30.

Beneath the plane of the block 70 and in advance of the mechanism just described is mounted for reciprocatory movement a transfer plate 86 having a beveled face 87 normally disposed beneath the pin 60 and with its lower edge beneath the pins 29 and 30. This transfer plate 86 is carried by a bar 88 extending beneath the block 70 and provided with a roll 89 engaging the cam 90 whereby the said plate is reciprocated to the rear being returned by means of the spring 91 mounted between the end of the bar 88 and the plate 92. This spring may be reinforced by a pair of springs 93, 93 anchored at one end to the cross pin 94, 94 of the fixed bracket 95, and at their other ends to a cross head 96 upon the end of a rod 97 extending within the bracket 95 and bearing against the rear end of the bar 88. When the partially formed link reaches the position shown in dotted lines in Fig. 18 with the eye portions of said link engaging the pins 29 and 30, the transfer plate 86 is moved by means of the cam 90 to the right engaging with its beveled face beneath the link upon each side of the pins 29 and 30, transferring the same therefrom upwardly on to the pins 84 and 85 of the arms 82. Thereupon the block 70 is moved to the left by its cam 76 carrying with it the plate 72 on account of the frictional engagement of the cam strips 81 and the bridging effect of the wire between the pins 84 and 85. When the wire extending between the two pins contacts in its central portion with the pin 60 it can go no farther and bends at this point permitting the arms 82 to approach each other under the action of the cams 81, the speed of movement of the plate 72 lessening and the cam strips 80 riding up the curved outer edge of the arms and forcing the same inwardly. The effect is to bend the medial portion of the wire, as indicated in Fig. 18, about the pin 60 to form a large eye 98, the pins 84 and 85 now occupying a position in advance of the pin 60 and closely adjacent each other, and the terminal portions 49ª and 49ᵇ of the wire occupying a position substantially in parallelism as indicated in said figure in full lines.

Immediately in advance of the normal position of the transfer plate 86, as shown for instance in Fig. 11, is transversely mounted a slide 99 provided in its upper face with a slot having one wall 100 extending at right angles to the slide axis and the other wall 101 extending diagonally thereof. This slide is actuated by means of a bar 102 having its lower face provided with a diagonally extending shoulder 103 for engagement with the inclined wall 101 of the slot, the opposite end of the bar 102 being in engagement with the cam 104 by which it is actuated toward the left, its return being effected by the suitably anchored spring 105. The movement of the bar 102 to the left serves to move the slide 99 in one direction by the engagement of the inclined surfaces 101 and 103, the return of this slide being effected by means of a spring 106.

Mounted in advance of the path of the slide 99 (Fig. 7) is a vertical bracket 107 within which is guided a slide 108 having a head 109 with a narrow projection 110. This slide 108 is actuated in a downward direction by means of the lever 111 upon the opposite end of which is mounted a roller 112 which engages with the cam 113, the return of the slide 108 being effected by means of the spring 114. In the lower portion of the same bracket is mounted for reciprocatory movement a clencher bar 115, the upper end of which is provided with a cam face 116 coacting with the cam face 117 of a plate 118 fixed upon the bracket. The clencher bar is reciprocated upwardly by means of a lever 119 bearing against the lower end of said bar as shown, and provided at the other end with a roller 120 in engagement with the cam 121, the return movement of the clencher bar 113 being effected by the spring 122.

While the link is held upon the pins 84, 85 and 60, as shown in full lines in Fig. 18, the forward ends 49ª and 49ᵇ of the link project across the path of the slide 99 and immediately above and overhanging the upper face thereof, on each side of the spacing projection 110, the slide being in its advanced position. The head 109 is then brought downward and the lower corner of the same engages the overhanging ends of the link and bends the same downwardly, as indicated in Fig. 21. The ends of the link at this time occupy a position immediately above the eye 98 of the previously formed link which rests upon the upper face of the plate 118 and with the coils of wire forming the eyes engaging the edge of said plate as shown in Fig. 14, the link being held down in this position by the spring pressed foot 123 mounted in the head 109. As the corner of the head 109 bends the end of the link downwardly through the eye 98 of the preceding link, the clencher bar 115 is moved upwardly and the downturned ends of the link enter a recess 124 in the edge of said clencher bar. The upper end of the bar is then deflected to the right by the engagement of the cam surfaces 116 and 117 whereby the bending of the link ends is continued about the slide 99, as indicated in Fig. 22. The slide 99 is thereupon withdrawn and the further upward movement of the clencher bar 115 completes the formation of the hook, as indicated in Fig. 23, thereby effecting a permanent connection between the end portion of one link and the terminal eye of the other link. Thereupon the stripper bar 65 is depressed by means of its cam 68, the projection 65ª engaging the terminal portions 49ª and 49ᵇ of the link and the projection 65ᵇ engaging the head of the link containing the eye 98 and stripping the link off of the three pins 84, 85 and 60, the accidental dislodgment of the link having been prevented by the protruding ends of the cross pin 61 over which the eye 98 is readily forced by the projection 65ᵇ. The pins 84 and 85 being now released the arms 82 are permitted to spring back and follow the plates 70 to their normal inactive position ready for the next link and, coincidentally therewith, the final clenching action of the bar 115 upon the link having lifted the eyes 50 and 51 out of engagement with the edge of the plate 118, the tension exerted upon the last formed link by the previously formed links wound upon the drum 125 causes the last formed link to jump forward until its eyes 50 and 51 engage over the rear edge of the plate 118 beneath the spring presser foot 123. While resting in this position the head of the preceding link rests in a channel 126 between the walls 127, 127 of a plate 128. Mounted within said plate to reciprocate transversely of said channel is a plunger 129 (Figs. 3, 14 and 24) having a pin 130 projecting therefrom and connected by a spring 131 with a suitable support 132. The outer end of the plunger 129 projects above the inclined surface of the cam member 133. The plate 128 moves downward with the head 109 and during such downward movement the end of the plunger 129 engages the cam 133 and is forced inwardly to engage the eye 50 and press the two eyes 50 and 51 and the parallel limbs 49ª and 49ᵇ snugly together as indicated in Fig. 24. During the time that the eye 98 is being formed in one link the eye 51 is being formed in the following link, and the eye 50 is being formed in the second preceding link, so that the several operations are being performed upon different links substantially simultaneously. The progress of the link through the machine to its final coupling to the preceding link and discharge from the machine as a portion of the chain is practically continuous, the whole operation being entirely automatic and exact.

While I have herein set forth with a considerable degree of particularity the details of construction entering into a preferred embodiment of the invention, it will be readily understood by those skilled in the art that various modifications and changes in the form, construction and arrangement may be adopted without sacrificing the material advantages or departing from the essence of the invention

I claim:

1. In a chain forming machine, wire feeding means, means to bend one end of the wire to form an eye, means to sever a length of wire containing the eye, means to bend the other end of the wire length to form a second eye spaced from the first, means to bend the intermediate wire portion to form a third eye at one side of the line connecting the first two eyes and to bring the terminal portions of the wire into parallelism, and means to bend the ends of the wires to form a hook to engage the third eye of the preceding link, substantially as described.

2. In a chain forming machine, wire feeding means, means to bend one end of the wire to form an eye, means to sever a length of wire containing the eye, means to bend the other end of the wire length to form a second eye spaced from the first, means to bend the intermediate wire portion to form a third eye about a point in the line dividing the first two eyes and to bring the terminal portions into parallelism in substantial alinement with the third eye, and means to bend the ends of the wire to form a hook engaged within the third eye of the preceding link, substantially as described.

3. In a chain forming machine, a traveling carrier, an eye forming pin carried thereby, a spinner having a fillet, means to actuate the carrier to bring the pin into axial alinement with the spinner, means to supply a length of wire between the fillet and pin, and means to rotate the spinner and fillet to sweep the wire about the pin to form an eye therein, substantially as described.

4. In a chain forming machine, a traveling carrier, blocks carried thereby, eye-forming pins arranged in pairs on the blocks, a pair of spinners having fillets, means to actuate the carrier to bring one of the pins into axial alinement with each of the spinners, means to supply a wire length between the fillet and its pin, and means to rotate the spinners and fillets to sweep the wire about the pins to form a pair of eyes therein, substantially as described.

5. In a chain forming machine, a traveling carrier, a series of blocks carried thereby, a pair of eye-forming pins on each block, a pair of spinners having fillets, means to actuate the carrier to bring the first pin of one pair beneath the first spinner and the second pin of the next pair beneath the second spinner, means to supply the wire between each fillet and its pin, means to sever the wire at a point between the two spinners, means to rotate the spinners and fillets to sweep the wire about the pins to form a pair of eyes therein, a pair of eye-receiving pins mounted to move in a direction transverse to the movement of the carrier, means to transfer the wire lengths from the eye-forming pins to the eye-receiving pins, a stationary pin mounted in the path of movement of the eye-receiving pins, and means to actuate the eye-receiving pins to bend that portion of the wire intermediate the eyes about the stationary pin to form a third eye at one side of a line connecting the first two eyes, and means to strip the link thus formed from the pins, substantially as described.

6. In a chain forming machine, a traveling carrier, a pair of eye-forming pins carried thereby, a pair of spinners having fillets, means to actuate the carrier to bring one of the pins into axial alinement with each of the spinners, means to supply a wire between each fillet and its pin, a pinion carried by each spinner, a rack-bar in mesh with each of the pinions, means to reciprocate the rack to rotate the spinners to sweep the ends of the wire about the pins to form a pair of eyes therein, substantially as described.

7. In a chain forming machine, a traveling carrier, blocks carried thereby, a pair of eye-forming pins on each block, a pair of spinners having fillets, means to actuate the carrier to bring one of the pins into axial alinement with each of the spinners, the spinners mounted to provide for limited axial displacement, a pinion carried by each spinner, a rack-bar having oppositely facing teeth one set being in mesh with each of the pinions, means to reciprocate the rack comprising a lever bearing on the rack to move the same in the active direction and a spring connected to the rack to move it in the inactive direction, a cam bearing on the lever to actuate the same, means to supply a wire length between each of the fillets and the adjacent pin whereby the terminal portions of the wire are engaged by the fillets and swept about the pins to form a pair of eyes therein, substantially as described.

8. In a chain forming machine, a traveling carrier, blocks carried thereby, a pair of eye-forming pins on each block, a pair of spinners having fillets, means to actuate the carrier to bring one of the pins into axial alinement with each of the spinners, the spinners mounted to provide for limited axial displacement, a pinion carried by each spinner, a rack-bar having oppositely facing teeth one set being in mesh with each of the pinions, means to reciprocate the rack comprising a lever bearing on the rack to move the same in the active direction and a spring connected to the rack to move it in the inactive direction, a cam bearing on the lever to actuate the same, means to supply a wire length between each of the fillets and the adjacent pin whereby the terminal portions of the wire are engaged by the fillets and swept about the pins to form a pair of eyes therein, a pair of eye-receiving pins movably mounted in a direction transverse to the movement of the carrier, means to transfer the eye containing wire from the eye-forming pins to the eye-receiving pins, a stationary pin mounted in the path of movement of the eye-receiving pins, means to move the eye-receiving pins to bend the wire at a point between the eyes about the stationary pin to form a third eye, and means to form a hook at the terminal ends of the wire, and means to strip the link thus formed from the eye-receiving pins and the stationary pin, substantially as described.

9. In a chain forming machine, a traveling carrier, a series of blocks carried thereby, a pair of pins carried by each block, a pair of spinners each having a fillet and spaced apart a distance corresponding roughly to the distance between successive blocks, means to advance the carrier step by step to bring the first pin of one pair beneath the first spinner, means to supply the wire between the first fillet and the first pin, means to rotate the spinner and fillet to sweep the forward end of the wire about the pin to form an eye therein, the step by step movement of the carrier being so gaged as to bring the second pin of the first pair at the next actuation beneath the second spinner and the first pin of the next pair beneath the first spinner, means to sever the wire at a point intermediate the two spinners, means to rotate the second spinner to sweep the rear terminal portion of the wire length about the second pin to form a second eye therein simultaneously with the sweeping of the forward portion of the succeeding wire link about the first pin of the next pair to form a first eye in such wire length, means to bend the intermediate wire portion to form a third eye at one side of a line connecting the first two eyes and to bring the terminal portions of the wire into parallelism, and means to bend the ends of the wires to form a hook engaging the third eye of the preceding link, substantially as described.

10. In a chain forming machine, a traveling carrier, a series of blocks carried thereby, a pair of pins carried by each block, a pair of spinners each having a fillet and spaced apart a distance corresponding roughly to the distance between successive blocks, means to advance the carrier step by step to bring the first pin of one pair beneath the first spinner, means to supply the wire between the first fillet and the first pin, means to rotate the spinner and fillet to sweep the forward end of the wire about the pin to form an eye therein, the step by step movement of the carrier being so gaged as to bring the second pin of the first pair at the next actuation beneath the second spinner and the first pin of the next pair beneath the first spinner, means to sever the wire at a point intermediate the two spinners, means to rotate the second spinner to sweep the rear terminal portion of the wire length about the second pin to form a second eye therein simultaneously with the sweeping of the forward portion of the succeeding wire link about the first pin of the next pair to form a first eye in such wire length, a pair of eye-receiving pins movable in a direction transverse to the movement of the carrier, a stationary pin in the path of movement of the eye-receiving pins, means to transfer the wire containing the eye from the eye-forming pins to the eye-receiving pins, and means to actuate the eye-receiving pins to bend the wire at a point intermediate the eyes about the stationary pin to form a third eye and to bring the terminal portions of the wire into parallelism, means to bend the ends of the wire to form a hook engaging the third eye of the preceding link, and means to strip the link from the eye-receiving pins, substantially as described.

11. In a chain forming machine, a traveling carrier, a series of blocks carried thereby, a pair of pins carried by each block, a pair of spinners each having a fillet and spaced apart a distance corresponding roughly to the distance between successive blocks, means to advance the carrier step by step to bring the first pin of one pair beneath the first spinner, means to supply the wire between the first fillet and the first pin, means to rotate the spinner and fillet to sweep the forward end of the wire about the pin to form an eye therein, the step by step movement of the carrier being so gaged as to bring the second pin of the first pair at the next actuation beneath the second spinner and the first pin of the next pair beneath the first spinner, means to sever the wire at a point intermediate the two spinners, said means comprising a stationary plate and a reciprocatory bar having a knife edge coacting with the plate, and means acting upon the bar to force the same forward and shear the wire between the knife edge and the plate, means to rotate the second spinner to sweep the rear terminal portion of the wire length about the second pin to form a second eye therein simultaneously with the sweeping of the forward portion of the succeeding wire link about the first pin of the next pair to form a first eye in such wire length, means to bend the intermediate wire portion to form a third eye at one side of a line connecting the first two eyes and to bring the terminal portions of the wire into parallelism, and means to bend the ends of the wires to form a hook engaging a third eye of the preceding link, substantially as described.

12. In a wire working machine, the combination of a table, an arm overhanging and spaced from said table, a stationary plate secured to said arm and substantially perpendicular to the table, means to supply wire upon said table adjacent said plate, a pin projecting from said arm, a bar mounted for slidable movement with reference to the arm and above the table, said bar having a forward cutting edge and cam face and also having a rear cam face, a spring normally holding the bar in an elevated position with its forward cam face engaged beneath the pin, and means acting upon the rear cam face to force the bar forward, the pin acting upon the forward cam face to depress the bar and cause the same to engage with the plate at the level of the table whereby to shear the wire, substantially as described.

13. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and to bring the terminal portions of the wire into parallelism, means to strip the wire from the stationary pins and the eye-receiving pins, and means to bend the ends of the wire to form a hook engaging the third eye of the preceding link, substantially as described.

14. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, said transferring means comprising a plate having a beveled edge and mounted to reciprocate in a direction transverse to the movement of the carrier and beneath the wire whereby to lift the same from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and to bring the terminal portions of the wire into parallelism, means to strip the wire from the stationary pins and the eye-receiving pins, and means to bend the ends of the wire to form a hook engaging the third eye of the preceding link, substantially as described.

15. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and to bring the terminal portions of the wire into parallelism, said means comprising a block mounted for limited movement relative to said arms and provided with strips lying on each side of said arms, said strips having inner cam faces coacting with outer cam faces of the said arms, the forward movement of the block relative to the arms causing the strips to ride up upon the arms and force the same inwardly, means to strip the wire from the stationary pins and the eye-receiving pins, and means to bend the ends of the wire to form a hook engaging the third eye of the preceding link, substantially as described.

16. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and to bring the terminal portions of the wire into parallelism, means to strip the wire from the stationary pins and the eye-receiving pins, said stripping means comprising a bar mounted for movement in a direction parallel to the axis of the pins and adapted to engage over the wire in the advanced position of the same, means to depress said bar, and means to bend the ends of the wire to form a hook engaging the third eye of the preceding link, substantially as described.

17. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and to bring the terminal portions of the wire into parallelism, means to strip the wire from the stationary pins and the eye-receiving pins, and means to bend the ends of the wire to form a hook engaging the third eye of the preceding link, said means comprising a slide movable in a direction transverse to the parallel wire ends and beneath such wires at a slight distance from their ends, a reciprocatory head adapted to engage the overhanging ends of the wires and bend the same downwardly, a clencher bar mounted to reciprocate in opposition to the head and to engage the downturned ends of the wire and bend the same upwardly around the slide and to clench the same as the slide is withdrawn, substantially as described.

18. In a chain forming machine, a traveling carrier, a pair of eye-forming pins carried thereby, a spinner having a fillet, means to advance the carrier step by step to bring the first pin into axial alinement with the spinner, means to supply a length of wire between the fillet and pin, means to rotate the spinner and fillet to sweep the wire about the pin to form an eye therein, means to sever the length of wire containing the eye, the step-by-step movement of the carrier gaged to bring the second pin to rest in alinement with the spinner whereby to sweep the rear end of the wire about the second pin to form a second eye in the wire, a pair of swinging arms arranged above the path of the eye-forming pins and provided with downwardly extending eye-receiving pins with which the eye-forming pins are adapted to register axially in a position of rest, means to transfer the wire length from the eye-forming pins on to the eye-receiving pins, said transferring means comprising a plate having a beveled edge and mounted to reciprocate in a direction transverse to the movement of the carrier and beneath the wire whereby to lift the same from the eye-forming pins on to the eye-receiving pins, a stationary pin disposed in a line at one side of and bisecting a line connecting the eye-receiving pins, means to move the arms carrying the eye-receiving pins in a forward direction and concurrently toward each other to bend the wire at a point intermediate the eyes about the stationary pin to form a third eye therein and bring the terminal portions of the wire into parallelism, said means comprising a block mounted for limited movement relative to said arms and provided with strips lying on each side of said arms, said strips having inner cam faces coacting with outer cam faces of the said arms, the forward movement of the block relative to the arms causing the strips to ride up upon the arms and force the same inwardly, means to strip the wire from the stationary pins and the eye-receiving pins, said stripping means comprising a bar mounted for movement in a direction parallel to the axis of the pins and adapted to engage over the wire in the advanced position of the same, means to depress said bar, and means to bend the ends of the wire to form a hook engaging the third eye of the preceding link, substantially as described.

19. In a chain forming machine, wire feeding means, means to bend one end of the wire to form an eye, means to sever a length of wire containing the eye, means to bend the other end of the wire length to form a second eye spaced from the first, means to bend the intermediate wire portion to form a third eye about a point in a line dividing the first two eyes and to bring the terminal portions of the wire into parallelism in substantial alinement with the third eye, means to bend the ends of the wires to enter the third eye of the preceding link, means to clench the bent ends of the wire to form a closed hook engaging the preceding link, and means to press the two limbs of the link firmly together to impart a final set to the same, substantially as described.

20. In a chain forming machine, wire feeding means, means to bend one end of the wire to form an eye, means to sever a length of wire containing the eye, means to bend the other end of the wire length to form a second eye spaced from the first, means to bend the intermediate wire portion to form a third eye about a point in a line dividing the first two eyes and to bring the terminal portions of the wire into parallelism in substantial alinement with the third eye, means to bend the ends of the wires to enter the third eye of the preceding link, means to clench the bent ends of the wire to form a closed hook engaging the preceding link, means to press the two limbs of the link firmly together to impart a final set to the same, such means comprising a channeled plate adapted to receive the link, a plunger movable transversely of said channel, and means engaging the end of the plunger to force the same inwardly so as to clamp the first and second eyes of the link between the plunger and the side wall of the channel, substantially as described.

21. In a chain forming machine, the combination with means to form a pair of spaced eyes in a wire section, of means to bend the wire terminals to form a link, said means comprising a pair of members each having a pin to engage within one of the pair of eyes, a third pin, and means to impart movement to one of the sets of pins relative to the other whereby to bend the wire at a point intermediate the eyes about the third pin to bring the terminals into parallelism, substantially as described.

22. In a chain forming machine, the combination with means to form a pair of spaced eyes in a wire section, of means to form a third eye and to bend the wire terminal to form a link, said means comprising a pair of movable members each having a pin to engage within one of the pair of eyes, a stationary third pin, and means to impart movement to the members whereby to bend the wire at a point intermediate the eyes about the third pin to form a third eye and to bring the terminals into parallelism, substantially as described.

23. In a chain forming machine, the combination with means to form a pair of spaced eyes in a wire section, of means to bend the wire terminals to form a link, said means comprising a movable block, a pair of strips mounted on the sides of the block face, a plate slidably mounted on the block between the strips, a pair of swinging arms pivoted on the plate and each having a pin to engage within one of the pair of eyes, a stationary third pin mounted in advance of and on the line between the pair of pins, and means to advance the block and with it the plate to cause the strips to force the arms inwardly to bend the wire at a point intermediate the eyes about the stationary pin to bring the wire terminals into parallelism, substantially as described.

24. In a chain forming machine, the combination with means to form a pair of spaced eyes in a wire section, of means to form a third eye and to bend the wire terminal to form a link, said means comprising a movable block, a pair of strips mounted on the sides of the block face and having inner cam faces, a plate slidably mounted on the block between the strips and having a slot and pin connection with the block, a pair of swinging arms pivoted on the plate and each having a pin to engage within one of the pair of eyes, and an outer cam face to coact with the adjacent strip, a stationary third pin mounted in advance of and on a line between the pair of pins, and means to advance the block and with it the plate to cause the strips to ride up on the arms and force the same inwardly to bend the wire at a point intermediate the eyes about the stationary pin to form a third eye and to bring the terminals into parallelism, substantially as described.

25. In a chain forming machine, the combination with means to form a pair of spaced eyes in a wire section, of means to bend the wire terminals to form a link, said means comprising a pair of members each having a pin to engage within one of the pair of eyes, a third pin, and means to impart movement to one of the sets of pins relative to the other whereby to bend the wire at a point intermediate the eyes about the third pin to bring the terminals into parallelism, means to bend the link terminals to engage within an eye of a previously formed link, and means to clench the terminals within such link comprising a clencher bar mounted to reciprocate transversely of the link axis, said bar having a recess to receive the link ends, a stationary cam face coacting with the bar, and means to reciprocate the bar whereby to cause the same to advance toward the link and simultaneously to be deflected laterally by the cam face to carry the link ends laterally and forwardly to clench the same upon the preceding link, substantially as described.

26. In a chain forming machine, the combination with means to form a pair of spaced eyes in a wire section, of means to form a third eye and to bend the wire terminal to form a link, said means comprising a pair of movable members each having a pin to engage within one of the pair of eyes, a stationary third pin, means to impart movement to the members whereby to bend the wire at a point intermediate the eyes about the third pin to form a third eye and to bring the terminals into parallelism, means to bend the link terminals to engage within an eye of a previously formed link, and means to clench the terminals within the said link comprising a clencher bar mounted to reciprocate transversely of the link axis, said bar having a lateral recess to receive the link ends and also provided on the opposite side with a cam face, a stationary cam face to coact with the face of the bar, and means to reciprocate the bar whereby to cause the same to advance toward the link and simultaneously to be deflected laterally to carry the link ends laterally and forwardly to clench the same upon the preceding link, substantially as described.

27. In a wire working machine, the combination of mechanism for initially forming the end of a continuous wire, mechanism for performing a second operation on said initially formed end, and cutting mechanism operating to cut off said initially formed end from the continuous wire subsequent to the operation of said primary forming mechanism and prior to the operation of said secondary forming mechanism.

28. In a wire working machine, the combination of mechanism for initially forming the end of a continuous wire, mechanism for secondarily forming said formed end, and cutting mechanism interposed between said forming mechanisms for severing the formed end of said wire.

29. In a wire link making machine, the combination of mechanism for initially bending the end of a continuous wire into incomplete link form, means for completing the formation of the link, and cutting mechanism interposed between said bending and forming mechanisms for severing the link from said continuous wire.

30. In a wire link making machine, the combination of mechanism for forming the end of a continuous wire into incomplete link shape, means for completing the formation of the link, cutting mechanism interposed between said forming mechanisms for severing the link from said continuous wire, and transfer mechanism engaging the formed end of said wire to transfer it into the field of said second forming mechanism.

31. In a wire link making machine, the combination of mechanism for forming the end of a continuous wire into an incomplete link shape, means for further forming the incomplete link, transfer mechanism for advancing the initially formed end of said continuous wire into the field of said second forming mechanism, and cutting mechanism operating intermediate said forming mechanism to sever the initially formed end of said continuous wire prior to the operative movement of said second forming mechanism.

32. In a wire link making machine, the combination of mechanism for initially bending the end of a continuous wire into incomplete link form, means for secondarily forming the link, transfer mechanism engaging said initially formed end of the continuous wire to advance said initially formed end into the field of said second forming mechanism and to advance a succeeding portion of said continuous wire into the field of said first forming mechanism, and cutting mechanism interposed between said forming mechanisms for severing the formed end.

33. In a wire-fabric unit-making machine, mechanism for initially shaping a part of the unit while it remains a part of the continuous wire supply, wire-feeding mechanism for advancing the partly formed unit, which utilizes the shaped part of the unit to effect a definite feed movement, and mechanisms for severing and completing the unit.

34. In a step by step feed, wire-fabric unit-making machine, mechanisms for performing an initial shaping operation on a unit while still a part of a continuous wire supply, feed mechanism which utilizes the shaped part of the attached unit for drawing forward and imparting a definite advance step to the material, secondary forming mechanism which further shapes the unit after it moves from its initial position, and severing mechanism coöperatively associated with the feed and forming mechanisms.

35. In a step by step feed, wire-fabric unit-making machine, mechanism for performing an initial shaping operation on a unit while still a part of a continuous wire supply, feed mechanism which utilizes the shaped part of the attached unit for drawing forward and imparting a definite advance step to the material, secondary forming mechanism which further shapes the unit after it moves from its initial position, and severing mechanism coöperatively associated with the feed and forming mechanisms, said initial forming and secondary forming mechanisms being timed to coöperate so that before the feed control of the wire is lost by the severing of the leading unit, the feed control is transferred to a partly formed succeeding unit and definite feeding thus maintained.

36. In a wire-fabric unit-making machine, initial forming mechanism, secondary forming mechanism, feeding mechanism, transfer mechanism and severing mechanism, all coöperatively associated to partly form a unit while still unsevered from a continuous wire supply, advance the material a definite step, sever and transfer the unit, and perform a further forming operation to complete the unit.

37. In a wire-fabric unit-making machine adapted to form units having one or more full-turn-coil eyes, mechanism for initially forming a first eye while the unit remains a part of the continuous wire supply, feed mechanism which engages and utilizes said first initially formed eye for feeding forward the stock a definite step, secondary forming mechanism for further shaping the unit in its new position, severing mechanism, and transfer mechanism.

38. In a link forming machine, the combination of a relatively stationary mechanism for initially forming a link length of wire, a second relatively stationary mechanism for secondarily forming said link length, and mechanism for transferring the partly formed link into the field of the secondary forming mechanism.

39. In a link forming machine, the combination of relatively stationary mechanism for initially forming a length of wire into incomplete link form, a second relatively stationary mechanism for performing a further operation upon said incomplete link, and transfer mechanism for successively moving said link length of wire into the field of each of said forming mechanisms.

40. In a chain making machine, the combination of relatively stationary mechanism for initially forming a length of wire into incomplete link form, a second relatively stationary mechanism for performing a further operation upon said incomplete link, transfer mechanism for successively moving said link length of wire into the field of each of said forming mechanisms, and mechanism for connecting a succession of said links into a continuous chain.

41. In a chain making machine, the combination of relatively stationary mechanism for initially forming a length of wire into incomplete link form, a second relatively stationary mechanism for secondarily forming said incomplete link, connecting mechanism for joining a succession of said links into a continuous chain, and step-by-step transfer mechanism operating to move said length of wire successively into the field of each of said mechanisms.

42. In a chain making machine, the combination of primary and secondary mechanisms for forming the eye-end of a link, mechanism for connecting the links together into a continuous chain, and step-by-step transfer mechanism for moving the incomplete link from the field of the primary to the field of the secondary eye-forming mechanism.

JOHN F. GAIL.

Witnesses:
J. H. CANTWELL,
JOHN BURNS.